(12) United States Patent
Sugai

(10) Patent No.: US 8,525,046 B2
(45) Date of Patent: Sep. 3, 2013

(54) ELECTRONIC APPARATUS

(75) Inventor: Takahiro Sugai, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 317 days.

(21) Appl. No.: 12/961,261

(22) Filed: Dec. 6, 2010

(65) Prior Publication Data

US 2011/0147075 A1    Jun. 23, 2011

(30) Foreign Application Priority Data

Dec. 17, 2009   (JP) ................................. 2009-286679

(51) Int. Cl.
*H01R 13/46*    (2006.01)

(52) U.S. Cl.
USPC ........................................................ 174/520

(58) Field of Classification Search
USPC .................. 174/520, 50, 252, 254, 260, 503, 174/548, 564, 565; 361/728, 752, 761, 765
See application file for complete search history.

(56) References Cited

U.S. PATENT DOCUMENTS

2002/0047749 A1    4/2002    Sugawara

FOREIGN PATENT DOCUMENTS

| JP | 02-132887 | 5/1990 |
|---|---|---|
| JP | 2-222599 | 9/1990 |
| JP | 10-256435 | 9/1998 |
| JP | 2002-134873 | 5/2002 |
| JP | 2002-353595 | 12/2002 |
| JP | 2005-075897 | 3/2005 |
| JP | 2005-268521 | 9/2005 |

OTHER PUBLICATIONS

Japanese Patent Application No. 2009-286679; Notice of Reasons for Rejection; Mailed Jun. 7, 2011 (English translation).
Japanese Patent Application No. 2009-286679; Notice of Reasons for Rejection; Mailed Mar. 1, 2011 (English translation).

*Primary Examiner* — Jeremy Norris
*Assistant Examiner* — Tremesha S Willis
(74) *Attorney, Agent, or Firm* — Blakely, Sokoloff, Taylor & Zafman LLP

(57) ABSTRACT

According to one embodiment, an electronic apparatus includes a housing having electric insulation properties, and a circuit element installed in the housing and including a plurality of connection terminals, wherein the housing includes an inner surface including a mounting region on which the circuit element is mounted, a plurality of adhesive filled portions in the mounting region, which are separated by a division wall in order to correspond to the connection terminals of the circuit element, and through which the connection terminals are inserted, and a plurality of traces provided on the inner surface of the housing, one ends of the traces running through the adhesive filled portions, wherein the adhesive filled portions of the housing are filled with conductive adhesive which fix the circuit element to the mounting region, and wherein the connection terminals are electrically connected to the traces by the conductive adhesive.

13 Claims, 5 Drawing Sheets

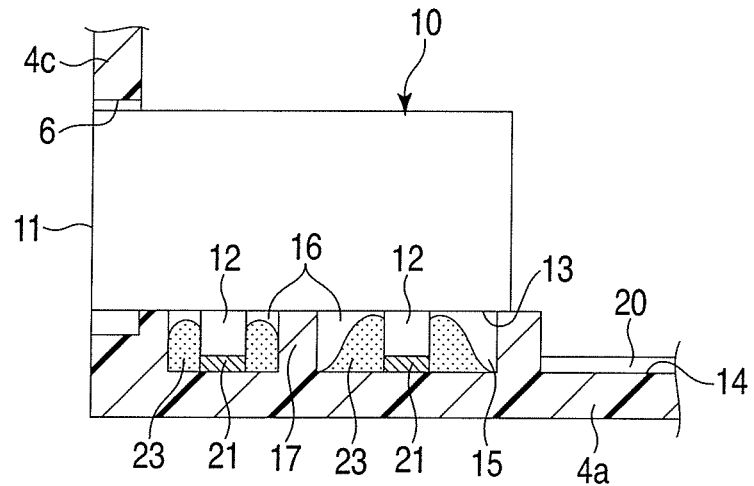
F I G. 3
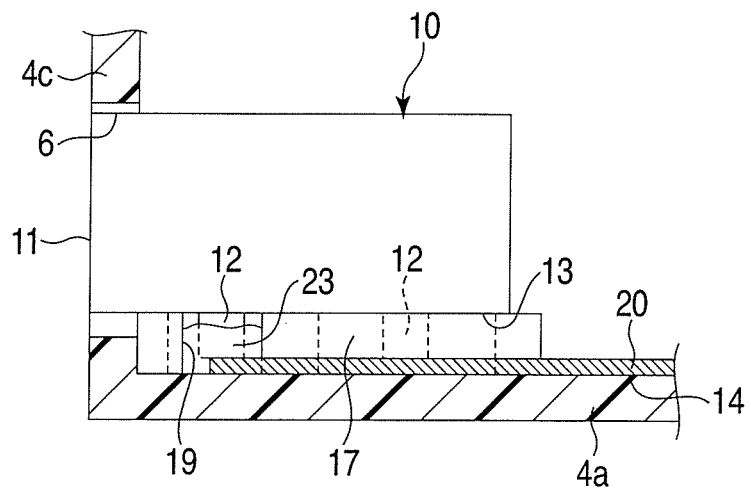
F I G. 4

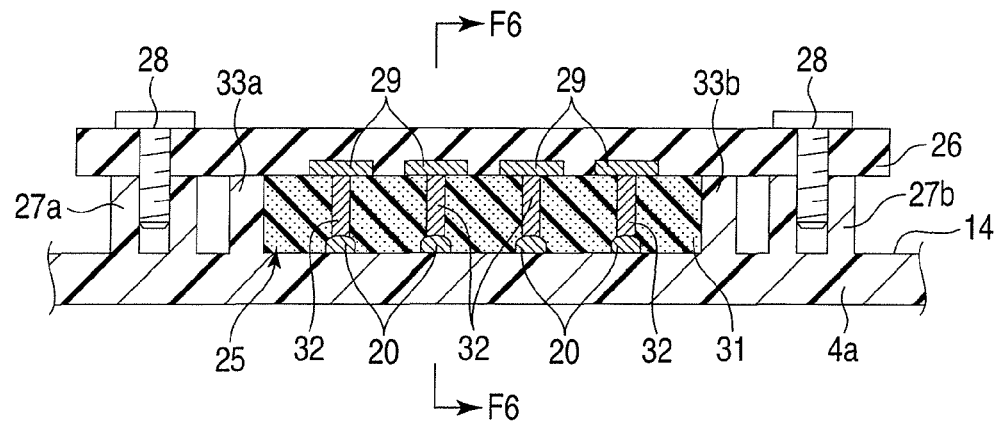
F I G. 5
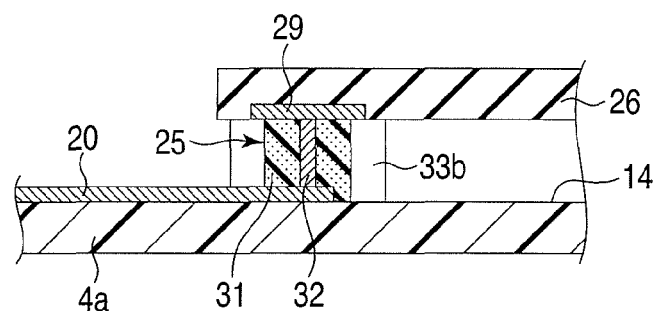
F I G. 6
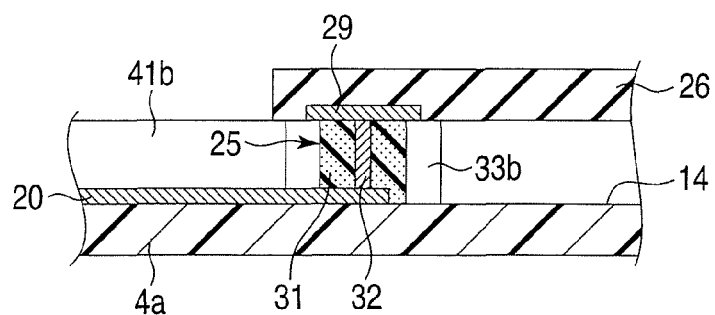
F I G. 8

ELECTRONIC APPARATUS

CROSS-REFERENCE TO RELATED APPLICATIONS

This application is based upon and claims the benefit of priority from Japanese Patent Application No. 2009-286679, filed Dec. 17, 2009; the entire contents of which are incorporated herein by reference.

FIELD

Embodiments described herein relate generally to an electronic apparatus the inside of the housing of which has a signal line to which a circuit element is fixed by a conductive adhesive.

BACKGROUND

An electronic apparatus, such as a portable computer or a cellular phone, comprises a connecter through which peripheral equipment is connected. The connector is housed inside the electronic apparatus and is exposed through an opening in the periphery of the housing.

The apparatus also comprises a printed circuit board which has a connector mounting region in which a plurality of pads are arranged. The connector comprises a plurality of connection terminals corresponding to the pads, the connection terminals being soldered to the pads.

There is an increasing need to make the housing of a portable electronic apparatus, such as a portable computer, thinner. As a way of doing this, Jpn. Pat. Appln. KOKAI Publication No. 2005-268521, for example, discloses an electronic apparatus in which a conductive adhesive is printed on the inside of the housing to form a circuit pattern integrated with the housing, and connection terminals are bonded to the lands of the pattern.

With this arrangement, the circuit pattern and a connector are electrically connected by the conductive adhesive forming the circuit pattern, and the connector is fixed at a predetermined position on the housing. This eliminates the need for a printed circuit board, saves space and makes the housing thinner.

Jpn. Pat. Appln. KOKAI Publication No. 2005-268521 also discloses that the circuit pattern formed by the conductive adhesive takes the form of thin lines. This structure makes it difficult to ensure a sufficient connection area between the circuit pattern and the connection terminals of a connector.

Thus, sufficient adhesive strength between the connector and housing may not be achieved, impairing the soundness of the electrical and mechanical joining of the connector.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary cross sectional view of the housing in which the connector is bonded to a connector mounting region by a conductive adhesive according to the first embodiment.

FIG. 4 is an exemplary cross sectional view showing the positional relation between the housing in which the traces and adhesive filled portions are comprised and the connector according to the first embodiment.

FIG. 5 is an exemplary cross sectional view of the housing in which the traces and a printed circuit board are electrically connected by a rubber connector according to the first embodiment.

FIG. 6 is an exemplary cross sectional view of the portable computer shown in FIG. 5, taken along the line F6-F6.

FIG. 8 is an exemplary cross sectional view of the housing in which the traces and a printed circuit board are electrically connected by a rubber connector according to the second embodiment.

DETAILED DESCRIPTION

Various embodiments will be described hereinafter with reference to the accompanying drawings.

In general, according to one embodiment, an electronic apparatus includes: a housing having electric insulation properties; and a circuit element installed in the housing and including a plurality of connection terminals, wherein the housing includes: an inner surface including a mounting region on which the circuit element is mounted; a plurality of adhesive filled portions in the mounting region, which are separated by a division wall in order to correspond to the connection terminals of the circuit element, and through which the connection terminals are inserted; and a plurality of traces provided on the inner surface of the housing, one ends of the traces running through the adhesive filled portions, wherein the adhesive filled portions of the housing are filled with conductive adhesive which fix the circuit element to the mounting region, and wherein the connection terminals are electrically connected to the traces by the conductive adhesive.

A description will now be given of the first embodiment, with reference to FIGS. 1 to 7.

Figure 1:
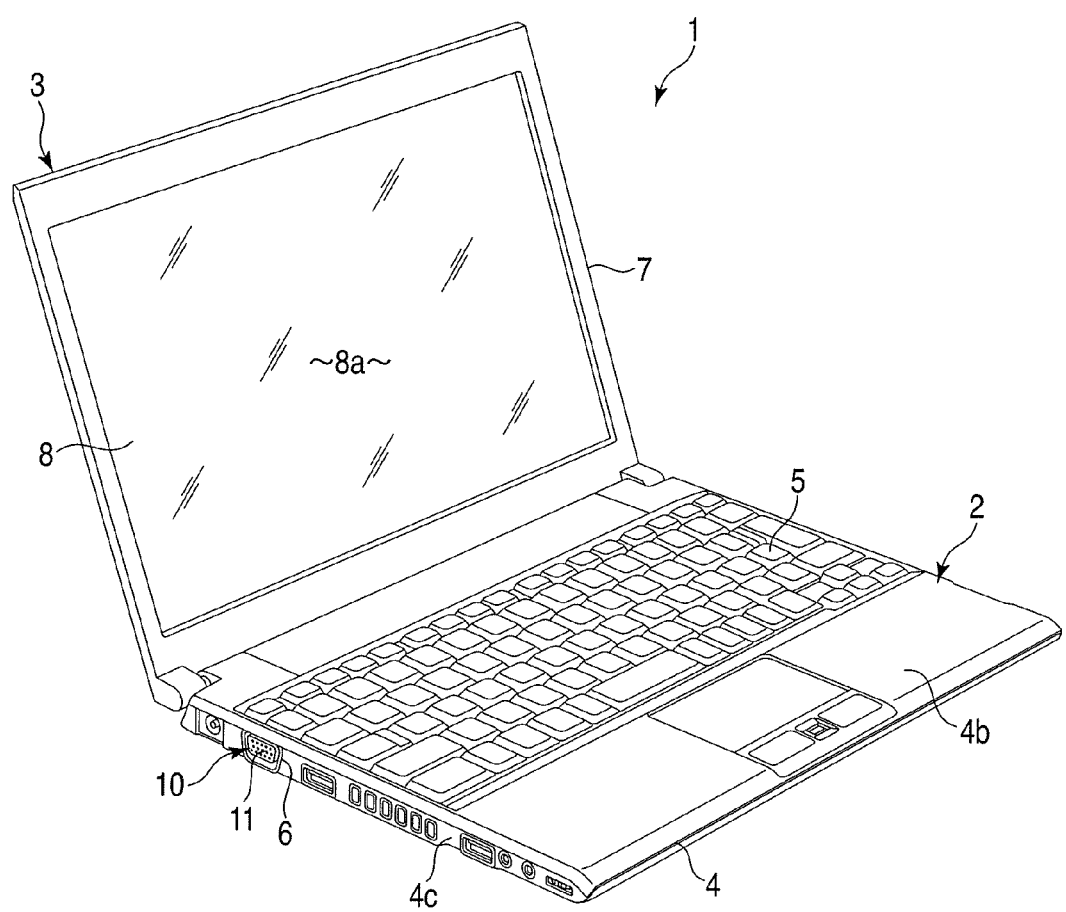
FIG. 1 is an exemplary perspective view showing a portable computer according to the first embodiment.

FIG. 1 is a perspective view showing a portable computer 1 which is an example of the electronic device. The portable computer 1 includes a computer main body 2 and a display module 3.

The computer main body 2 includes a housing 4 which is formed, for example, of synthetic resin and has electric insulation properties. The housing 4 is shaped like a flat box including a bottom wall 4a, an upper wall 4b and sidewall 4c. The upper wall 4b of the housing supports a keyboard 5. The sidewall 4c extends from the side edges of the bottom wall 4a. The sidewall 4c of the housing 4 comprises a rectangular opening 6.

As shown in FIG. 1, the display module 3 includes a display housing 7 and a liquid crystal display panel 8 which is housed in the display housing 7. The display housing 7 is shaped like a flat box and is about the same size as the computer main body 2. The liquid crystal display panel 8 comprises a screen 8a which shows image information and text information. The screen 8a is exposed from the front surface of the display housing 7.

The display module 3 is supported at the rear edge of the computer main body 2 by a hinge not shown in the figures. The display module 3 is pivotable between a closed position where the display module 3 is laid parallel to the computer main body 2 to cover the keyboard 5 and an open position where the display module 3 is raised relative to the computer main body 2 to expose the keyboard 5 and the screen 8a.

Figure 2:
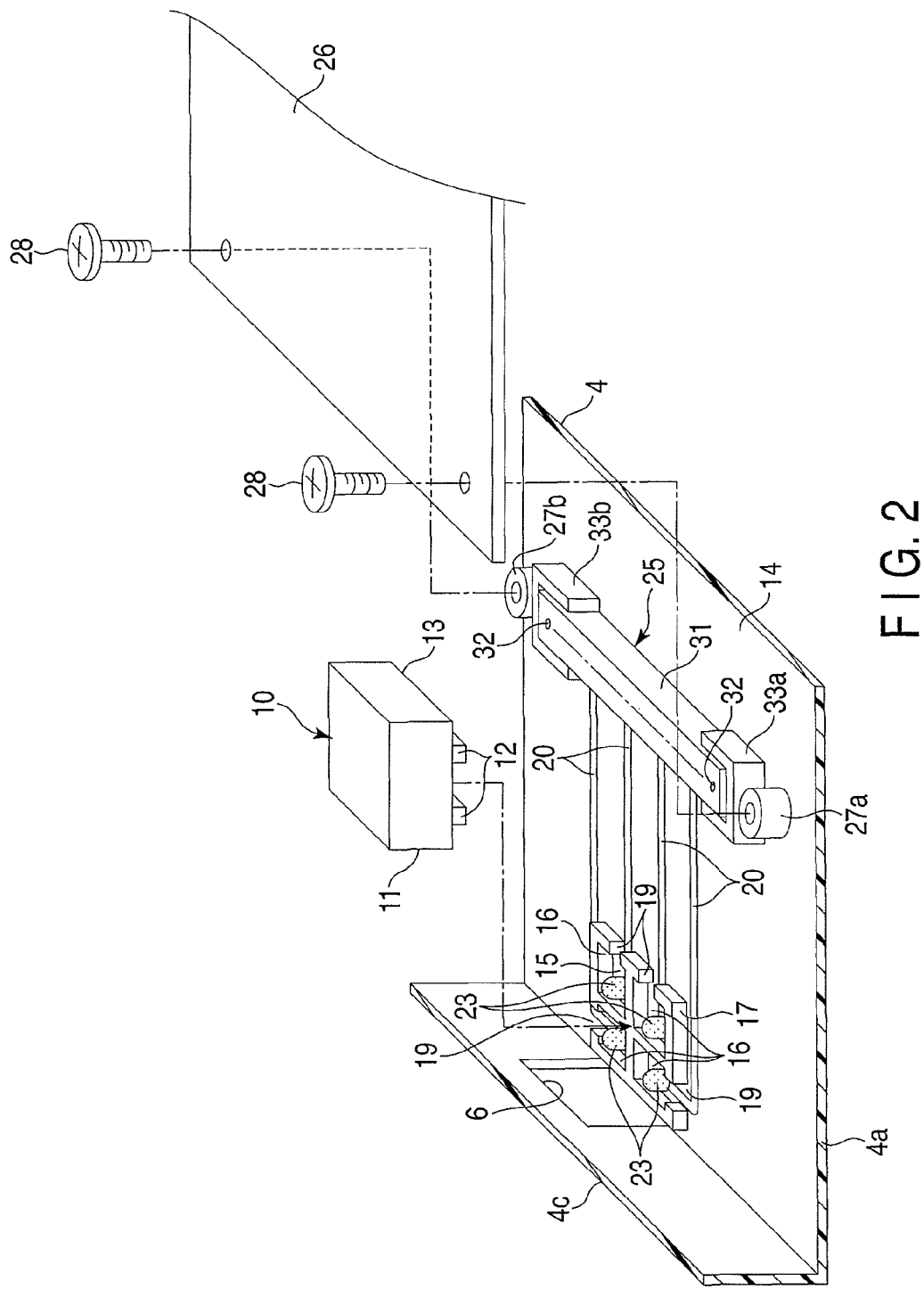
FIG. 2 is an exemplary perspective view of the dismantled housing in which a plurality of traces and a plurality of adhesive filled portions are comprised, and connector having a connection terminal according to the first embodiment.

As shown in FIGS. 1 and 2, a connector 10 which is an example of the circuit element is arranged in the opening 6 of the sidewall 4c. The connector 10 is to connect peripheral equipment such as an external monitor (not shown in the figures) to the portable computer 1. The connector 10 comprises a socket 11 through which a plug of peripheral equipment is connected and a plurality of connection terminals 12. The socket 11 is exposed through the opening 6 of the housing 4. The connection terminals 12 are arranged like a matrix on a flat bottom surface 13 of the connector 10 and project from the bottom surface 13. The connector 10 is supported on an upper surface 14 of the bottom wall 4a of the housing 4. The upper surface 14 of the bottom wall 4a is an example of the inner surface of the housing. The upper surface 14 of the bottom wall 4a includes a connector mounting region 15. The connector mounting region 15 is adjacent to the opening 6, and the connector 10 is fixed to the housing 4 in the connector mounting region 15.

As shown in FIG. 2 to FIG. 4, the connector mounting region 15 comprises a plurality of adhesive filled portions 16. The adhesive filled portions 16 are divided to form a lattice by a division wall 17 so as to correspond to the connection terminals 12. The division wall 17 takes the form of a framework which extends upward from the upper surface 14 of the bottom wall 4a, and surrounds each adhesive filled portion 16. Each adhesive filled portion 16 is opened and larger than each connection terminal 12 of the connector 10.

The division wall 17 comprises a plurality of trace introduction portions 19. Each of the trace introduction portions 19 is shaped like a slit opened toward the adhesive filled portion 16. The upper surface 14 of the bottom wall 4a is exposed at the trace introduction portions 19.

As shown in FIG. 2, a plurality of traces 20 are provided on the upper surface 14 of the bottom wall 4a. The traces 20 are formed integrally with the housing 4 by applying the conductive adhesive linearly on the upper surface 14 of the bottom wall 4a. The traces 20 extend widthways parallel to each other and separate from each other. The conductive adhesive is applied on the upper surface 14 of the bottom wall 4a by a screen printing method or a dispensing method, for example.

One of the ends of each trace 20 runs through the trace introduction portion 19 of the division wall 17 into the adhesive filled portion 16. As shown in FIG. 3, a land 21 is provided at the end of each trace 20. The lands 21 are placed on the adhesive filled portions 16, and the width of the lands 21 is greater than the width of the traces 20.

As shown in FIGS. 3 and 4, the connector 10 laid on the division wall 17. The bottom surface 13 of the connector 10 covers the adhesive filled portions 16 from above so that the connection terminals 12 of the connector 10 are inserted into the adhesive filled portions 16 and laid on the lands 21.

A conductive adhesive 23 is filled in each of the adhesive filled portions 16. The conductive adhesive 23 is hardened so as to integrally cover the connection terminals 12 and the lands 21. The conductive adhesive 23 filled in the adjoined adhesive filled portions 16 is kept electrically insulated by the division wall 17.

In this structure, the connector 10 is fixed to the connector mounting region 15 of the housing 4 by the conductive adhesive 23 so that the connection terminals 12 of the connector 10 are maintained electrically connected to the lands 21 of the traces 20.

As shown in FIG. 2, the ends of the traces 20 opposed to the lands 21 are placed away from the connector mounting region 15, and arranged side by side and separate from each other on the upper surface 14 of the bottom wall 4a. As shown in FIGS. 2, 5 and 6, the ends of the traces 20 opposed to the lands 21 are electrically connected to one end of a printed circuit board 26 by a rubber connector 25. The one end of the printed circuit board 26 is fixed to a pair of bosses 27a and 27b projecting from the upper surface 14 of the bottom wall 4a by screws 28. A plurality of pads 29 are provided on the bottom at the one end of the printed circuit board 26. The pads 29 are arranged side by side and separate from each other to correspond to the ends of the traces 20 opposed to the lands 21.

The rubber connector 25 is provided between the bottom wall 4a and the one end of the printed circuit board 26. The rubber connector 25 comprises a connector body 31 which is formed of an elastic body of, for example, silicone rubber, and a plurality of wires 32 which penetrate the connector body 31. The wires 32 are arranged separate from each other and parallel to each other.

The connector body 31 of the rubber connector 25 is held by a pair of connector holders 33a and 33b projecting from the upper surface 14 of the bottom wall 4a, and extends along the line in which the ends of the traces 20 and the pads 29 are arranged.

The connector body 31 is compressed between the bottom wall 4a and the one end of the printed circuit board 26. This brings the opposite ends of the wires 32 into contact with the ends of the traces 20 opposed to lands 21 and the pads 29, respectively, thereby establishing electrical connections between the traces 20 and the pads 29 of the printed circuit board 26 by the wires 32.

The connector 10 is fixed to the connector mounting region 15 of the housing 4 as described below.

First, a suitable amount of a conductive adhesive 23 is filled in each of the adhesive filled portions 16 in which the lands 21 of the traces 20 are provided, for example, by a dispensing method. The connector 10 is placed on the division wall 17 of the connector mounting region 15, and the connection terminals 12 of the connector 10 are inserted into the adhesive filled portions 16 in which the conductive adhesive 23 is filled. Then, the connection terminals 12 are brought into contact with the lands 21 through the conductive adhesive 23, and the connection terminals 12 and the lands 21 are covered with the conductive adhesive 23.

Next, the conductive adhesive 23 is hardened by heating to room temperature or high temperature. By this step, the connector 10 is fixed to the connector mounting region 15, and the connection terminals 12 of the connector 10 are kept electrically connected to the lands 21 of the traces 20.

According to the aforementioned first embodiment, the plurality of adhesive filled portions 16 which are formed as a lattice are provided on the connector mounting region 15 of the housing 4, and each connection terminal 12 of the connector 10 is inserted into each adhesive filled portion 16. The connection terminals 12 are fixed to the housing 4 by the conductive adhesive 23 filled in the adhesive filled portions 16 and kept electrically connected to the lands 21 of the traces 20.

Since the adhesive filled portions 16 are separated by the division wall 17, the conductive adhesive 23 filled in the adjacent adhesive filled portions 16 is isolated from each other so as to prevent a short circuit. This structure ensures the sufficient amount of conductive adhesive 23 filled in each adhesive filled portion 16. In addition, the contact areas of the conductive adhesive 23 and the adhesive filled portions 16 and the contact areas of the conductive adhesive 23 and the connection terminals 12 are increased, thereby improving the adhesive strength between the connector 10 and the connector mounting region 15.

Therefore, the electrical connection between the connector 10 and the traces 20 is ensured, and the connector 10 is firmly fixed to the connector mounting region 15.

The connector 10 receives an external force which pries the connector 10 when peripheral equipment is plugged in or out. However, the aforementioned structure securely fixes the connector 10 so as to resist the external force. This prevents wobbling of the connector 10 when peripheral equipment is plugged in or out, and peripheral equipment is easily plugged in or out.

In addition, according to the aforementioned structure, the division wall 17 which separates the adhesive filled portions 16 as a lattice is integrally formed on the bottom wall 4a of the housing 4, and the division wall 17 functions as a rib which reinforces the connector mounting region 15. This improves stiffness of the bottom wall 4a and prevents the bottom wall 4a from bending, thereby improving adhesion of the connector 10.

In addition, the division wall 17 comprises a plurality of trace introduction portions 19. With this structure, the conductive adhesive is lineally applied from the adhesive filled portions 16 to the upper surface 14 of the bottom wall 4a, and the traces 20 are integrally provided on the upper surface 14 of the bottom wall 4a by the conductive adhesive.

The present invention is not limited to the first embodiment, but may be modified without departing from the spirit or scope of the general inventive concept.

Figure 7:
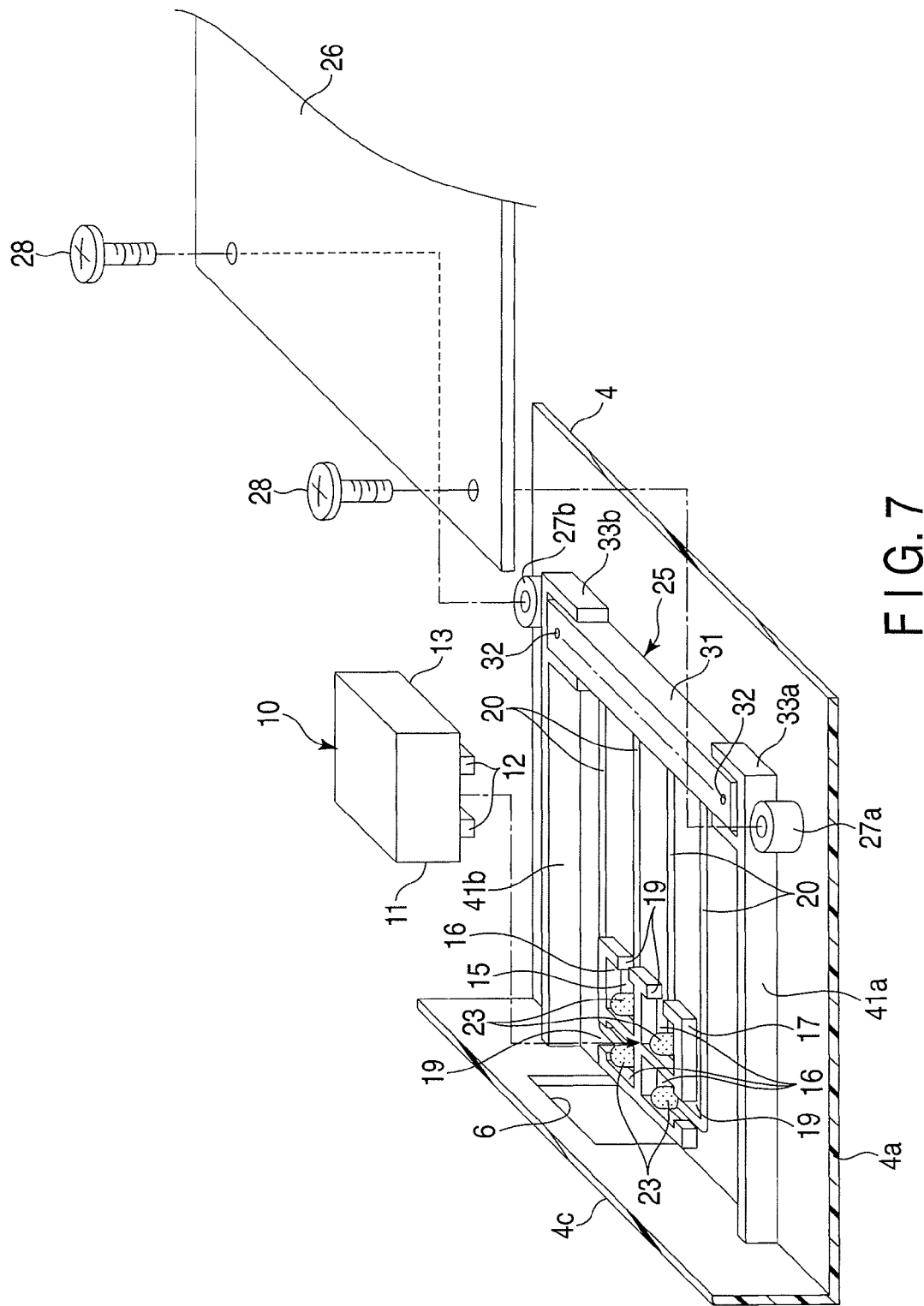
FIG. 7 is an exemplary perspective view of the dismantled housing in which a plurality of traces and a plurality of adhesive filled portions are comprised, and the connector having a connection terminal according to the second embodiment.

For example, FIGS. 7 and 8 show the second embodiment. The structures of a portable computer 1 of the second embodiment are similar to the structures described in the first embodiment except that a bottom wall 4a of a housing 4 in which traces 20 are provided is reinforced. The following descriptions will therefore focus mainly on how the second embodiment differs from the first embodiment. The structural components or elements that are similar to those of the first embodiment will be denoted by the same reference symbols, and a repetitive description of such components or elements will be omitted.

As shown in FIG. 7, a pair of extensions 41a and 41b are formed integrally with an upper surface 14 of the bottom wall 4a of the housing 4. The extensions 41a and 41b are raised relative to the bottom wall 4a and arranged parallel to the traces 20. The extensions 41a and 41b are arranged separate from each other and parallel to each other. The extensions 41a and 41b connect connector holders 33a and 33b to a sidewall 4c of the housing 4. In this embodiment, the traces 20 and adhesive filled portions 16 separated by a division wall 17 are provided between the extensions 41a and 41b.

In this structure, the extensions 41a and 41b are formed integrally on the bottom wall 4a of the housing 4, and the traces 20 are provided between the extensions 41a and 41b. The extensions 41a and 41b functions as a rib to reinforce the region of the bottom wall 4a in which the traces 20 are provided. This improves stiffness of the bottom wall 4a and prevents the bottom wall 4a from bending, thereby preventing the traces 20 provided on the bottom wall 4a by a conductive adhesive from being broken or damaged.

The extensions may be provided between the neighboring traces. In such a case, the extensions and the traces are alternately arranged on the bottom wall, and this further improves stiffness of the bottom wall and protects each trace by the extensions.

In the first embodiment, the housing is formed of synthetic resin, but may be formed of metal such as magnesium and aluminum. When the housing is formed of metal, the traces are isolated from the housing by forming the traces on an insulating layer on the inner surface of the housing, for example.

In addition, the circuit element attached to the housing is not limited to the connector, but may be an electronic element such as a semiconductor package, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing in which at least an inner surface has electric insulation properties;
   a circuit element installed in the housing and comprising a connection terminal;
   a circuit board situated within the housing,
   wherein the housing comprises:
      a mounting region which is provided on the inner surface and on which the circuit element is mounted,
      an adhesive filled portion provided in the mounting region, which is separated by a division wall projecting from the inner surface of the housing at a position corresponding to the connection terminal of the circuit element, and through which the connection terminal is inserted, and
      a trace provided on the inner surface of the housing and configured to connect the circuit element with the circuit board, a first end of the trace running through the adhesive filled portion,
      wherein the circuit element is fixed to the mounting region by a conductive adhesive filled in the adhesive filled portion, and the connection terminal is electrically connected to the trace via the conductive adhesive.

2. The electronic apparatus of claim 1, wherein the connection terminal of the circuit element is covered with the conductive adhesive.

3. The electronic apparatus of claim 1, wherein the division wall has a rib-like shape.

4. The electronic apparatus of claim 1, wherein the division wall comprises a trace introduction portion which opens toward the adhesive filled portion, and the trace runs through the trace introduction portion into the adhesive filled portion from the inner surface of the housing.

5. An electronic apparatus comprising:
   a housing in which at least an inner surface has electric insulation properties;
   an element installed in the housing; and
   a circuit board situated within the housing,
   wherein the housing comprises:
      a plurality of adhesive filled portions which is separated by a projection projecting from the inner surface of the housing in order to correspond to a plurality of connection terminals of the element, and through which the connection terminals are inserted, and a plurality of traces provided on the inner surface of the housing and configured to connect the element with the circuit board, the first ends of the traces running through the adhesive filled portions, wherein the adhesive filled portions are filled with a conductive adhesive used for fixing the element to the housing, and the connection terminals are electrically connected to the traces via the conductive adhesive.

6. The electronic apparatus of claim 5, wherein the projection has a rib-like shape.

7. The electronic apparatus of claim 5, wherein the traces are made of the conductive adhesive.

8. The electronic apparatus of claim 5, wherein the adhesive filled portions are divided to form a lattice by the projection so as to correspond to the connection terminals.

9. The electronic apparatus of claim 5, wherein each adhesive filled portion is larger than each connection terminal of the element.

10. The electronic apparatus of claim 1, further comprising a connector provided on the inner surface of the housing and configured to be connected to the board, wherein a second end of the trace is connected to the connector.

11. The electronic apparatus of claim 5, further comprising a connector provided on the inner surface of the housing and configured to be connected to the board, wherein second ends of the traces are connected to the connector.

12. The electronic apparatus of claim 1, wherein the circuit element covers the adhesive filled portion.

13. The electronic apparatus of claim 5, wherein the element covers the adhesive filled portion.

* * * * *